United States Patent [19]

Girguis et al.

[11] 4,191,031
[45] Mar. 4, 1980

[54] SWIVEL JOINT

[75] Inventors: Sobhy L. Girguis, Troisdorf; Werner Krude, Neunkirchen, both of Fed. Rep. of Germany

[73] Assignee: Uni-Cardan Aktiengesellschaft, Lohmar, Fed. Rep. of Germany

[21] Appl. No.: 861,563

[22] Filed: Dec. 16, 1977

[30] Foreign Application Priority Data

Dec. 21, 1976 [DE] Fed. Rep. of Germany ....... 2657820
Dec. 21, 1976 [DE] Fed. Rep. of Germany ....... 2657821

[51] Int. Cl.² .............................................. F16D 3/30
[52] U.S. Cl. ........................................................ 64/21
[58] Field of Search ........................................ 64/21, 7

[56] References Cited

U.S. PATENT DOCUMENTS

| | | | |
|---|---|---|---|
| 3,452,558 | 7/1969 | Cull | 64/21 |
| 3,664,152 | 5/1972 | Macielinski | 64/21 |
| 3,789,626 | 2/1974 | Girguis | 64/21 |
| 3,798,927 | 3/1974 | Girguis | 64/21 |
| 3,815,381 | 6/1974 | Wagner | 64/21 |
| 3,857,256 | 12/1974 | Girguis | 64/21 |
| 3,875,762 | 4/1975 | Tampalini | 64/21 |
| 4,034,576 | 7/1977 | Takahashi | 64/21 |

Primary Examiner—Charles J. Myhre
Assistant Examiner—R. C. Turner
Attorney, Agent, or Firm—Toren, McGeady and Stanger

[57] ABSTRACT

A swivel joint for transmitting torque between a drive shaft and a driven shaft includes an outer joint member having an interior cavity connected with one of the shafts and an inner joint member carried within the cavity connected with the other shaft. A first plurality of ball receiving grooves are formed on the interior wall surface of the cavity and a second plurality of ball receiving grooves equal in number to the first plurality are formed on the exterior surface of the inner joint member. A ball is carried between at least one pair of corresponding ball receiving grooves of the first and second plurality of grooves for transmitting torque between the inner and outer joint members. A cage having circumferentially arranged window recesses is positioned between the inner and outer joint members and the balls are retained in the window recesses. A stop face is provided on the inside of the inner joint member and a cooperating bearing surface is provided on the cage for engaging the stop face at predetermined angular displacements of the inner joint member with respect to the outer joint member.

10 Claims, 9 Drawing Figures

SWIVEL JOINT

BACKGROUND OF THE INVENTION

The present invention relates to swivel joints of the parallel or constant velocity type for transmitting torque between a drive shaft and a driven shaft. Such joints include an outer joint member connected with one of the shafts and an inner joint member connected with the other shaft. The outer joint member has a hollow cavity and the inner joint member is arranged within the cavity. The interior wall surface of the cavity has a first plurality of ball receiving grooves and the exterior surface of the inner joint member has a second plurality of ball receiving grooves equal in number to the first plurality. The plurality of grooves are arranged so that a ball for transmitting torque between the inner and outer joint members is carried between one pair of corresponding grooves. In this arrangement, the balls of each pair of grooves are subjected to a force caused by clearances or play which are a result of large manufacturing tolerances. This force tends to displace the balls out of their homokinetic plane in a direction causing a decrease in the angle formed by a plane containing the centers of the balls and the axis of rotation of the inner joint member. This type of joint also includes a cage having a plurality of circumferentially arranged window recesses, which is arranged between the inner and outer joint members, the balls being retained in the window recesses.

In such constant velocity, or parallel transmission joints, which are used in steering linkages for motor vehicles, manufacturing tolerances usually result in clearances which affect the steering control of the torque transmitting elements. As a result of such clearances, forces act on the torque transmitting elements displacing them out of a homokinetic plane detrimentally affecting the torque transmission capacity of the joint and its serviceable life. The adverse effects of such clearances become more significant when the inner joint member is deflected with respect to the outer joint member (i.e., when the axis of rotation of the inner joint member is angularly displaced relative to the axis of rotation of the outer joint member). Such adverse effects progressively increase even for a displacement angle of approximately 25°-30°. This is particularly true in joints which are provided with axially extending parallel ball receiving grooves, the balls carried between the grooves acting as the torque transmitting elements.

Further, one of the problems particularly found in motor vehicles is that considerable steering forces are required when operating the vehicle around corners, especially at very low speeds, or at very low tire pressures. In view of the modern trend towards the use of front-wheel drive vehicles, it has become customary to select a negative roll-radius for front wheel adjustment in order to ensure substantially straight forward movement of the vehicle even in situations of asymmetrical braking. However, such negative steering roll-radius also affects the general steering behavior of the vehicle since the wheels of the vehicle will not automatically return to a normal straight condition after tight cornering.

It is accordingly the principal object of the present invention to provide a swivel joint for a steering control linkage of the type having a cage for retaining ball torque transmitting elements, which can compensate for tilting movement of the cage as a result of play and clearances caused by manufacturing tolerances.

A further object of the present invention is to provide a swivel joint of the constant velocity or parallel type which has means for providing a restoring force effective during certain angular deflections of the joint, which force is either constantly effective on the joint or becomes effective when the angular displacement of the inner joint member with respect to the outer joint member reaches a certain predetermined angle.

Yet another object of the present invention is to provide a swivel joint having means to assist movement of the wheels to an original straight position after angular deflection of the joint caused by turning the wheels.

Other objects, features and advantages of the invention will become more apparent from the description of the invention in connection with the drawings to be described more fully hereinafter.

SUMMARY OF THE INVENTION

The foregoing objects of the present invention are generally accomplished by providing in a swivel joint of the type described hereinabove, a stop face on the inside of the inner joint member and a cooperating bearing surface on the cage engaging the stop face at a predetermined angle of displacement of the axis of the inner joint member with respect to the axis of the outer joint member.

The advantage of a cooperating stop face and bearing surface on the cage is that at a predetermined angle of displacement, which is less than the maximum permissible angle of displacement of the joint, the stop face will be engaged by the bearing surface of the cage. Accordingly, during further deflection of the inner joint member with respect to the outer joint member, the cage will be repositioned so that the centers of the ball torque transmitting elements will lie in a plane which bisects an angle of deflection between the inner and outer joint members. This will ensure that the centers of the balls return to an angle bisecting plane regardless of load conditions.

Additionally, as a result of this arrangement the balls, which have been shifted to a position adjacent the edges of the grooves, will return to the bottom of the groove track so as to reduce load per unit surface.

Further, because the balls are returned to a perfect parallel position, any of the balls which then have their centers passing through a plane which contains the axes of both the inner joint member and the outer joint member will be effective to transmit torque. Consequently, load is more evenly distributed over the balls and the static load capacity is increased.

In one embodiment of the invention, the stop face of the inner joint member is formed so as to be concentric with the axis of both the inner and outer joint members when they are aligned with each other, and the bearing surface is arranged at the front end of the cage facing the stop face.

The advantage of this arrangement is that, because of tumbling movement of the cage during rotation of the joint, the cage will engage the stop face along certain individual parts of its circumference even before the predetermined angle of displacement at which engagement between the stop face and bearing surface takes place, is reached. Accordingly, the foregoing advantages will result even at angles of displacement between the axes of the inner and outer joint members which are below the maximum deflection of the joint.

Another feature of the present invention is to provide a spring means between the stop face and the bearing surface of the cage so that the bearing surface engages the spring before reaching the stop face.

The use of such a spring means provides the additional advantage that a force, which is directed opposite to the tilting moments of the cage, assists in urging the cage to return into the angle bisecting plane. This force creates a restoring force which facilitates steering control of the joint. This force acting on the cage, is effective at most times, and at any rate during those times when the angle of displacement is approximately between 25° and 30°.

Another advantage of this arrangement is that improved steering control permits larger manufacturing tolerances resulting in larger clearances between elements. Constant velocity joints which have larger manufacturing tolerances are thus less expensive to manufacture and also generate less heat when in operation.

In addition, the use of the spring, which is operative either during all angles of displacement or only above a certain predetermined angle of displacement, creates a force which tends to restore the joint to a straight or non-deflected position. This force has the effect of reducing the effort needed to straighten out the turned front wheels, and thus improves driving safety. Because it is included within the joint, this means for producing a restoring force has all the advantages of a sealed and permanently lubricated unit.

The spring may be associated with the bearing surface of the cage. Such an arrangement would merely involve constructional or production considerations.

The spring can be one of a number of different types, such as for example a plate spring, a spiral spring, a leaf spring or a pad or block of an elastically deformable plastic material.

The elastic force which is required to be exerted by the spring will vary depending upon the type of joint in which it is being used. In joints where large amounts of deflection are anticipated, the point at which the bearing surface will engage the spring before encountering the stop face will be at a larger angle of displacement than in a joint where only small amounts of deflection are anticipated. Accordingly, different types of springs will be used in different types of joints.

When using a plate spring, which is securely attached to the cage, the outside diameter of the spring will be equal to the convex surface of the cage. Additionally, the stop face, which is engaged by the plate spring, is formed by an annular surface on a separate annular component which is carried on the inside surface of the cavity of the outer joint member.

The use of a plate spring mounted on the cage is advantageous in as much as the cage will only be displaced by an amount equal to half the deflection movement so that relatively little space is required.

BRIEF DESCRIPTION OF THE DRAWINGS

Embodiments of the present invention exemplifying the principles and features of the invention are illustrated by way of example in the accompanying drawings, in which.

DESCRIPTION OF THE INVENTION

Figure 1:
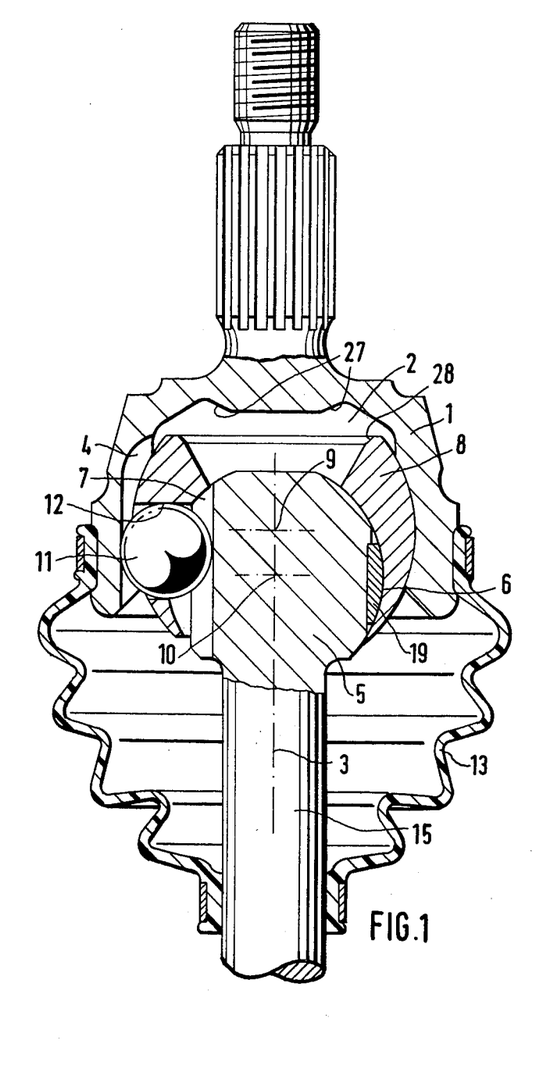
FIG. 1 is an axial sectional view showing a swivel joint in accordance with the present invention, having a stop face on the inside of the outer joint member, and showing the position of the inner and outer joint members with their axes parallel.

Referring now in more detail to the accompanying drawings, FIG. 1 illustrates a swivel joint for transmitting torque between a drive shaft and a driven shaft at a constant velocity. In the embodiment shown herein, the joint includes an outer joint member 1 which can be connected to the driven shaft. The joint member 1 has a cavity 2 which has an opening for receiving an inner joint member. A plurality of circumferentially spaced grooves 4 extend along the inner wall surface of the cavity 2 in a direction parallel to the axis of rotation 3 of the joint members. An inner joint member 5 which is connected to a drive shaft 15 is carried within the cavity 2 of the outer joint member 1. A plurality of longitudinal grooves 7, extending parallel to grooves 4, are provided on the outside wall surface of the inner joint member 5. In the embodiment shown, the inner joint member 5 and the drive shaft 15 form an integral unit which are made in one piece. A cage 8 having an outer convex surface and an inner concave surface is arranged between the inner joint member 5 and the outer joint member 1. A steering control member 19 is carried as a separate component on the inner joint member 5. Control member 19 has a convex surface 6 which guides the inner concave surface of the cage 8. The center 9 of the convex outer surface of the cage 8 and the center 10 of the concave inner surface of the cage 8 are located on opposite sides of a plane containing the center of torque transmitting balls 11.

The cage 8 further includes circumferentially spaced window recesses 12 which retain the torque transmitting balls 11. The torque transmitting balls 11 are also carried between a pair of oppositely positioned grooves 4 and 7 of the outer and inner joint members respectively. The number of grooves 4 on the outer joint member 1 is the same as the number of grooves 7 on the inner joint member 5, so that corresponding pairs of grooves 4 and 7 can support a single torque transmitting ball 11 between them. While only one ball is shown, a plurality of such torque transmitting balls is preferably provided. The cavity 2 of the outer joint member 1 is sealed by a concertina boot 13.

An annular stop face 27 is provided on the interior wall of the joint member 1 within the cavity 2. The annular stop face 27 is arranged concentric with the axis of rotation 3. An annular bearing surface 28 on a front end of the cage 8 is arranged for engaging the stop face 27 to determine the maximum angular displacement (or maximum degree of deflection) between the axes of the inner and outer joint members.

Figure 2:
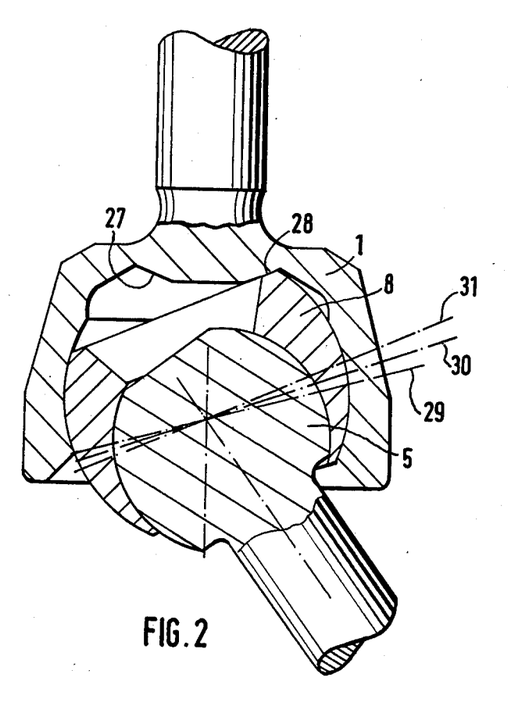
FIG. 2 is a view similar to that of FIG. 1 illustrating the inner and outer joint members with their axes displaced at an angle with respect to each other.

The position of maximum angular displacement between the inner joint member 5 and the outer joint member 1 is illustrated in FIG. 2, the angle of displacement being the angle at which the axis of the inner joint member 5 is displaced from the axis 3. It will be noted that the bearing surface 28 on cage 8 is in a position engaging the annular stop face 27 on the outer joint member 1. Cage 8 is thus prevented from any further angular rotation about the intersection of the axes of the inner and outer joint members by the engagement of the bearing surface 28 with the stop face 27. Even in the event of further angular displacement between the inner joint member 5 and the outer joint member 1, the cage 8 will not be further angularly displaced. At the point when the bearing surface 28 first engages the stop face 27, the axis of the inner joint member 5 will form an obtuse angle with the axis of the outer joint member 1. Reference numeral 30 indicates the plane which bisects this obtuse angle. At this point of initial engagement, the centers of the torque transmitting balls 11 will lie in a plane 29 which forms an angle with the axis of the inner joint member 5, which is less than the angle formed between the angle bisecting plane 30 and the axis of the inner joint member 5. Upon further angular deflection of the inner joint member 5 with respect to the outer joint member 1, the cage 8 will remain stationary but the balls 11 shift causing their centers to lie in a plane which forms an angle with the axis of the inner joint member that increases to a point larger than half the obtuse angle between the axes of the inner and outer joint members until the centers of the balls 11 lie in a plane 31. Plane 31 forms an angle with the axis of the inner joint member 5 which is larger than the bisecting angle. It will be noted in FIG. 2 that the planes in which the centers of the balls 11 lie pass through the point of intersection between the axes of the inner and outer joint members.

Because of a certain amount of play between the parts of the joint caused by manufacturing tolerances, the plane containing the centers of the balls 11 will have a tendency to shift in the direction of the plane 29 as the angle of displacement between the inner and outer joints increases. As the inner and outer joints are further deflected with respect to each other, the plane in which the centers of the balls 11 lie will shift in the direction of the angle bisecting plane 30 and subsequently in the direction of plane 31 because of the tumbling movement of the cage 8 during rotational movement causing the bearing surface 28 to strike against the annular stop face 27. As the joint members further deflect, the balls 11 will be caused to shift toward the edges of the grooves 4 and 7. In the position in which the balls lie in the plane 31, they will be forced back from the edges of the grooves into the base of the ball receiving grooves, thus resulting in a higher load bearing capacity of the joint.

Figure 3:
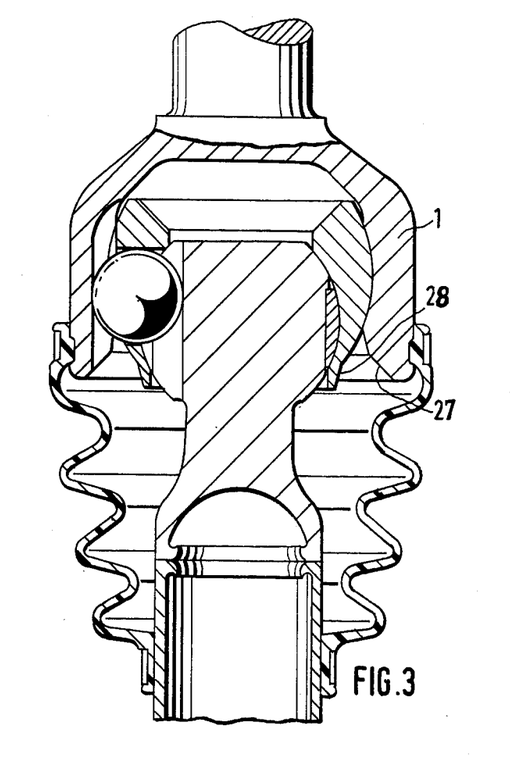
FIG. 3 is a view similar to that of FIG. 1 illustrating an embodiment of the invention in which the stop face is located at an area of the opening of the outer joint member.

FIG. 3 illustrates a joint which is substantially the same as the joint illustrated in FIG. 1 except that the stop face 27 is positioned at the opening of the cavity of the outer joint member 1. In this embodiment, the stop face 27 is in the form of a chamfered surface at the front edge of the opening. The bearing surface 28 of the cage 8 in this embodiment, is positioned at the thin edge of the cage, when viewed in cross section, rather than at the thick edge as illustrated in FIGS. 1 and 2. This positioning of the bearing surface provides means for increased static strength and stability.

Figure 4:
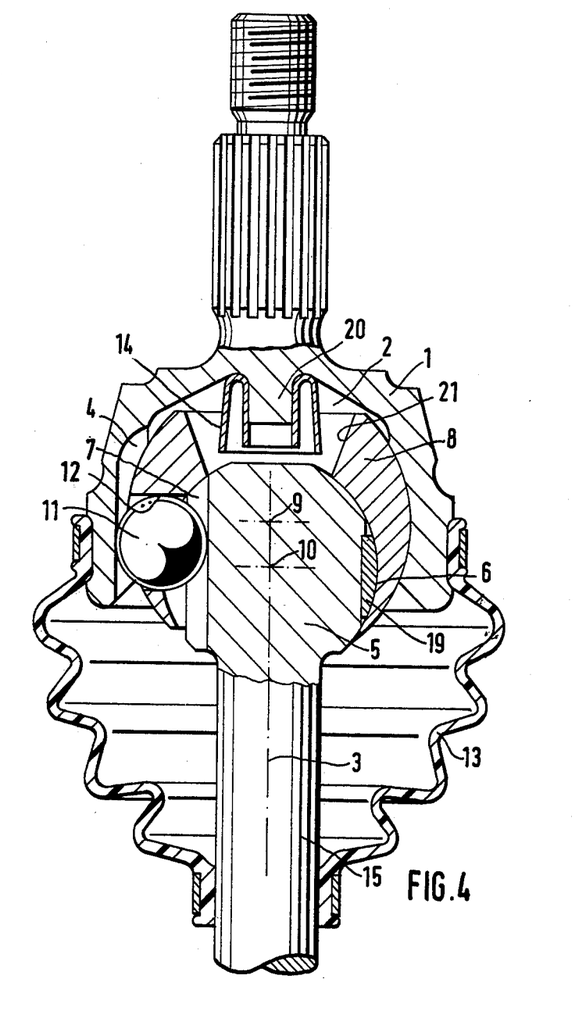
FIG. 4 is a view similar to that of FIG. 1 illustrating an embodiment of the invention having one type of spring positioned between the stop face and the bearing surface.

The structure of the joint illustrated in the embodiment of FIG. 4 is similar to that illustrated in FIGS. 1 and 2, however, in this embodiment a spring 14 is connected to a stud or heel projection 20 on the inside of the outer joint member 1. The spring 14 is therefore positioned between the stop face and the bearing surface on the cage 8. The bearing surface in this embodiment is formed by a conical surface 21. Therefore, during angular displacement of the inner joint member relative to the outer joint member, the conical surface 21 of the cage 8 will first engage the outer surface of the spring 14. Upon further displacement the spring 14 will yield to the force exerted on it by the conical bearing surface 21 up to a point of maximum angular displacement where the spring will not yield any further. The conical surface 21 will be in supporting engagement with a surface on the spring 14 during angular displacement of the joint upwards of angles of about 20°–23°. In its functional operation, the arrangement of FIG. 3 is substantially identical with that of the previously described embodiments, in as much as the conical bearing surface 21 will be fully engaged with the stop face without further yielding of the spring 14 up to a given displacement angle.

Figure 5:
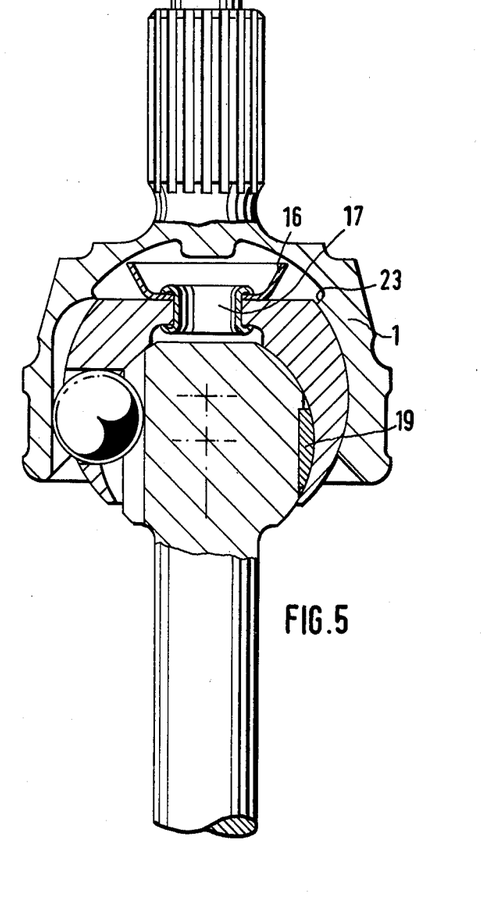
FIG. 5 is a view similar to that of FIG. 1 illustrating yet another embodiment of the present invention having another type of spring which is connected to the cage.

The embodiment of the joint shown in FIG. 5 is similar to that illustrated in FIG. 4 in that a spring is used to provide a degree of yielding movement between the stop face and bearing surface upon engagement with each other. In this embodiment, a spring 16 is secured to the cage 8 by a suitable fastening means 17. The stop face is formed by an annular surface 23 on the inside of the outer joint member 1. Upon angular displacement of the joint members, the tapered surface of the spring 16 will engage the annular stop face 23.

Figure 6:
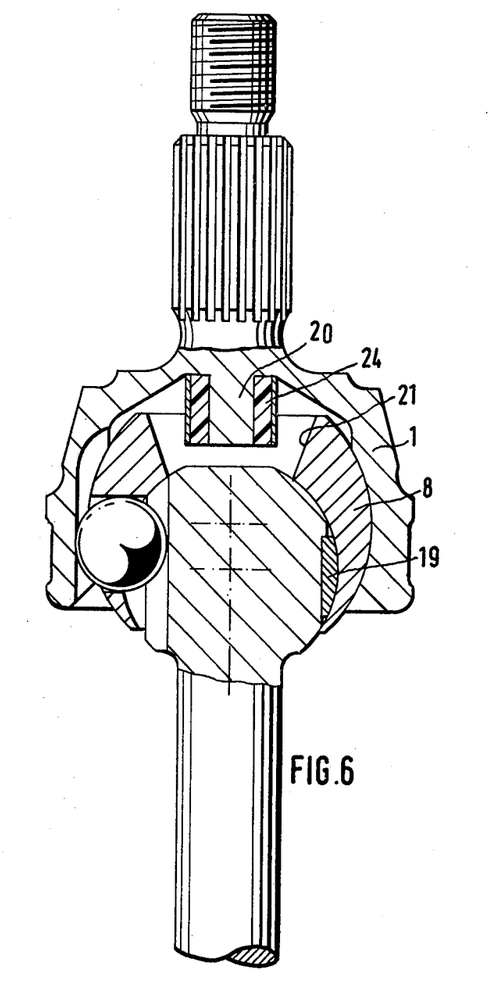
FIG. 6 is a view similar to that of FIG. 1 illustrating yet a further embodiment of the present invention having yet a further type of spring in the form of a block of resilient plastic material located between the stop face and the bearing surface for engaging the stop face.

FIG. 6 illustrates a further embodiment of the present invention, which is similar to the embodiment illustrated in FIG. 4. In this embodiment, the spring 14 of FIG. 4 is replaced by a deformable or resilient annular block 24, preferably made of deformable plastic material. The annular block 24 is carried on the stud 20 of the outer joint member 1. During angular displacement, the conical bearing surface 21 of the cage 8 will first engage the outside circumferential surface of the block 24. Upon further angular displacement, the block 24 will compress until it reaches a fully compressed condition defining the maximum displacement angle. In the embodiment shown in FIGS. 4 and 5, the spring members exert a force on the cage tending to urge the joint members into a non-deflected condition. Similarly, preapplied stresses to the block 24 in the embodiment of FIG. 6 will produce a force acting on cage 8 to also urge the joint member into a non-deflected position.

Figure 7:
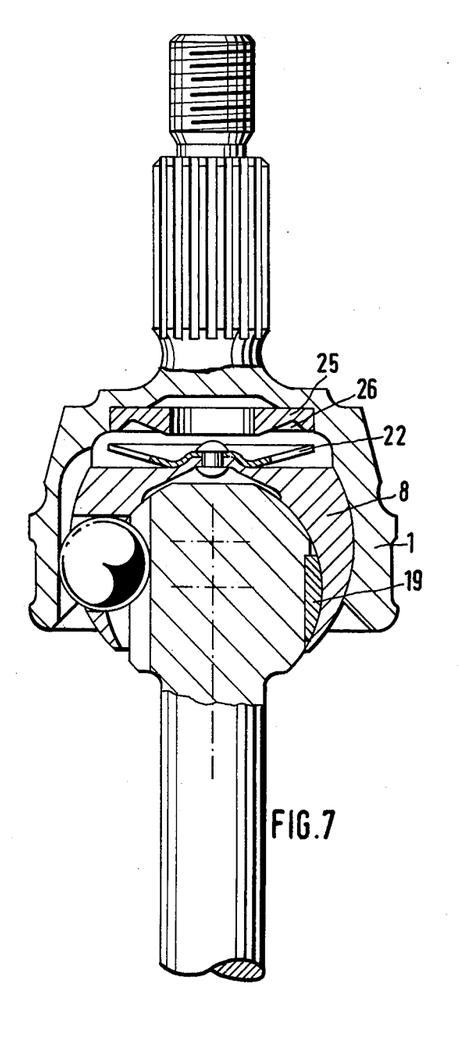
FIG. 7 is a view similar to that of FIG. 1 illustrating still a further embodiment of the present invention having a spring member in the form of a plate positioned between the stop face and the bearing surface.

In the embodiment illustrated in FIG. 7, a plate spring 22, having an outside diameter corresponding to the convex surface of the cage 8, is secured to the cage 8 such as by riveting. It will be appreciated that other suitable means for securing the plate spring 22 to the cage will be equally satisfactory. A separate annular component 25 is carried on the inside of the outer joint member 1. An annular surface 26 is machined into the annular component 25 to form the stop face. An annular portion of the surface of the plate spring 22 thus forms the bearing surface for engaging the stop face 26 upon deflection of the joint.

Figure 8:
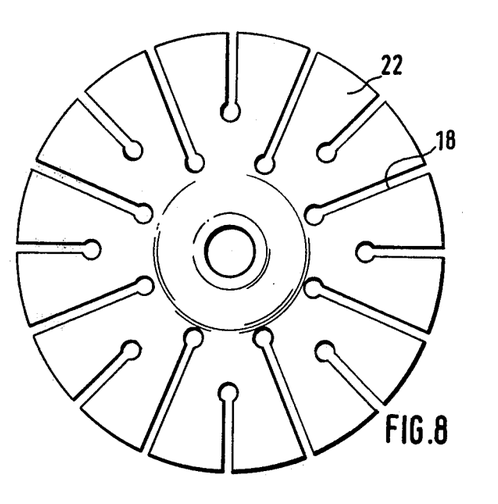
FIG. 8 is a plan view showing one type of plate spring used in the embodiment illustrated in FIG. 7.
Figure 9:
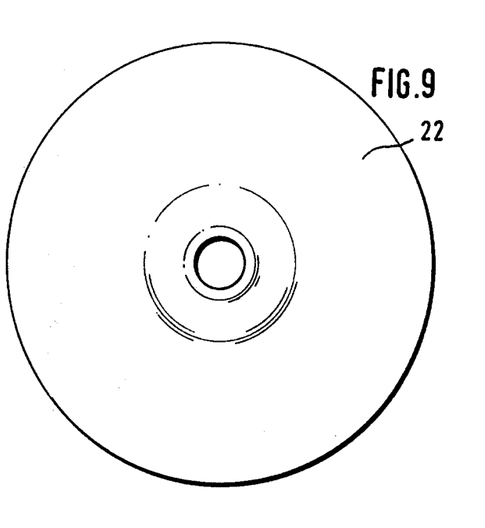
FIG. 9 is a plan view illustrating another type of plate spring for use in the embodiment illustrated in FIG. 7.

FIGS. 8 and 9 illustrate different embodiments of the plate spring 22. In the embodiment of FIG. 8, the plate spring is provided with a plurality of circumferentially spaced slits 18 radially extending inwards from the outer circumferential edge. This arrangement has the advantage that during deflection of the joint, only that part of the plate spring 22 which actually engages the stop face will be subjected to bending stresses or elastic action.

The plate spring illustrated in FIG. 9 is not provided with the radially extending slits but can equally function as a bearing surface.

FIGS. 1–7 each illustrate an embodiment of a swivel joint of the kind in which the cage is guided and supported on a steering control member 19. The invention, however, is equally applicable to joints of different kinds, such as for example to "DO" joints, or other cage controlled joints.

While the present invention has been described and illustrated with respect to certain preferred embodiments which produce satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. A swivel joint for transmitting torque between drive and driven members at a synchronized speed, comprising an outer joint member having an interior cavity, a first plurality of ball receiving grooves formed on the interior wall surface of said cavity, an inner joint member carried within said cavity, said inner joint member being capable of angular displacement relative to said outer joint member for a maximum permissible angle of displacement, a second plurality of ball receiving grooves formed on the exterior surface of said inner joint member, the number of grooves of said first plurality of ball receiving grooves corresponding to the number of grooves of the second plurality of ball receiving grooves, a ball carried between at least one pair of corresponding ball receiving grooves of said first and second plurality of grooves for transmitting torque between said inner and outer joint members, said ball in at least one pair of said grooves being subjected to a force caused by play when a diameter of said ball passes through a plane containing the axis of rotation of both said inner joint member and said outer joint member, a cage arranged between said inner and outer joint members, said cage having window recesses, said ball being retained in one of said window recesses, a stop face located on the inside of said outer joint member, and a cooperating bearing surface carried on said cage for engaging said stop face when said inner joint member is angularly displaced relative to said joint member for an angle smaller than the maximum permissible angle of displacement so that further angular displacement of said inner joint member relative to said outer joint member forces said ball out to its homokinetic plane in a direction causing an increase in the angle between a plane through the center of said ball and the intersection of the axes of said inner and outer joint members and the axis of said inner joint member which is greater than the bisecting angle between the axes of said inner and outer joint members.

2. The swivel joint according to claim 1 wherein said stop face is formed by a surface concentric with the axis of said outer joint member, and wherein said bearing surface is located on the end of said cage facing said stop face.

3. The swivel joint according to claim 1 further comprising spring means positioned between said stop face and said bearing surface resulting in yielding engagement between said bearing surface and said stop face.

4. A swivel joint according to claim 1 further comprising a spring associated with said bearing surface of said cage.

5. The swivel joint according to claim 3 wherein said spring is a plate spring.

6. The swivel joint according to claim 3 wherein said spring is a spiral spring.

7. The swivel joint according to claim 3 wherein said spring is a leaf spring.

8. The swivel joint according to claim 3 wherein said spring means is a block of elastically deformable plastic material.

9. The swivel joint according to claim 5 wherein said plate spring is secured to said cage, the outside diameter of said plate spring being equal to that of the convex surface of said cage.

10. The swivel joint according to claim 1 further comprising an annular component carried within said cavity on the inside of said outer joint member, an annular surface on said annular component forming said stop face, and further comprising a plate spring secured to said cage having an annular portion thereof forming said bearing surface.

* * * * *